United States Patent [19]
Brunt

[11] 3,880,737
[45] Apr. 29, 1975

[54] COMBINATION ELECTRODE

[75] Inventor: Alfred Edwin Brunt, Fife, Scotland

[73] Assignee: Beckman-Riic Limited, Glenrothes, Fife, Scotland

[22] Filed: June 25, 1973

[21] Appl. No.: 373,192

[30] Foreign Application Priority Data
June 29, 1972 United Kingdom............... 30511/72

[52] U.S. Cl. .......................... 204/195 G; 204/195 F
[51] Int. Cl. ..................... G01n 27/36; G01n 27/30
[58] Field of Search............. 204/1 T, 195 G, 195 F, 204/195 M; 128/2.1

[56] References Cited
UNITED STATES PATENTS
2,755,243  7/1956  Beckman et al. ............... 204/195 G
3,530,849  9/1970  Watanabe et al. .................... 128/2.1
3,676,319  7/1972  Kirsten ............................ 204/195 F
3,705,089  12/1972 Grubb ............................. 204/195 F
3,708,411  1/1973  Vanslette ........................ 204/195 M
3,718,569  2/1973  Peterson et al. ................ 204/195 G
3,741,884  6/1973  Deushane et al. ............... 204/195 F Primary Examiner—T. Tung
Attorney, Agent, or Firm—Brisebois & Kruger

[57] ABSTRACT

A combination electrode for use in electrmetric measurements of ion concentration and activity. A glass sensing electrode has arranged round its body a reference electrode which comprises a reference element and a salt bridge and which is held in place by a sleeve. The salt bridge comprises a layer of crystalline salt bridge material and a layer of an absortbant material.

2 Claims, 1 Drawing Figure

PATENTED APR 29 1975  3,880,737
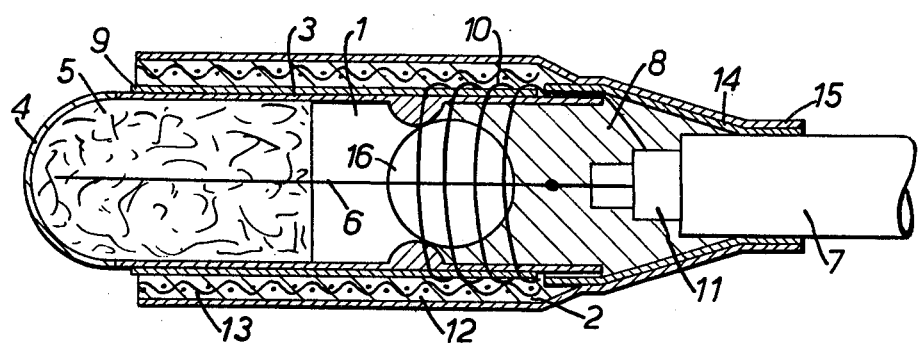

COMBINATION ELECTRODE

The present invention relates to combination electrodes for use in electrometric measurements of ion concentration and activity.

Previously proposed electrometric ion concentration and activity measuring systems, which use glass sensing-electrodes to respond to the ion concentration of the sample, include a reference electrode the potential of which is arranged to remain fixed, and which is coupled to the sample under test by a salt bridge. In these prior systems the sensing-electrode and the reference electrode, including a salt bridge tube, may be dipped separately into the sample. In certain circumstances the salt bridge may comprise fluids whose properties and purities are not certain, for example, when making in situ pH tests on gastric juices the reference electrode may be connected to the sample by being arranged in a container of a salt bridge solution in which is dipped the patient's finger, or a salt bridge tube may be arranged in the patient's mouth or nostril. In both cases body fluids act as a salt bridge and as their composition is uncertain errors in calculation can arise; in the former case, furthermore, the skin can cause a potential drop which leads to further errors.

It has also been proposed, however, to attach a salt bridge tube alongside the sensing electrode to form a single combination electrode and to pass these together into the sample. This system, while eliminating some of the difficulties of the first system introduces further disadvantages. The addition of a salt bridge tube increases the diameter of the electrode, the salt bridge tube being difficult to fill with salt bridge solution and the arrangement of the salt bridge tube being such that spillage of salt bridge solution could occur thus contaminating the sample.

The present invention provides a combination electrode comprising a glass sensing-electrode and a reference electrode arranged around the body of the sensing electrode, the reference electrode comprising a reference element and a salt bridge which includes a layer of a crystalline salt bridge material and a layer of an absorbant material for a salt bridge solution, there being provided a sleeve to retain the reference electrode in position and the reference electrode being electrically insulated from the sensing electrode.

The arrangement of the reference electrode around the sensing-electrode permits the whole system to be made very small, for example, the diameter can be arranged not to exceed 5 millimeters and the length not to exceed 25 millimeters for applications such as the measurement of the pH of gastric juices. This arrangement also ensures that the reference electrode and the sensing electrode are in close proximity thus eliminating errors caused by the coupling of the electrodes through a long and uncertain fluid bridge. The use of an absorbant material, preferably, woven glass fibre to hold the salt bridge solution, which is, advantageously, potassium chloride, allows ease of recharging the salt bridge, negates the need for a continuous supply of salt bridge solution as in free diffusion liquid junction systems and substantially prevents contamination of the sample by the salt bridge solution as occurs even with constrained diffusion junctions.

Advantageously, the sleeve provided on the reference electrode is a flexible plastics shrink sleeve and is arranged to compensate for changes in the pressure or temperature of the sample. This quality of the sleeve prevents the loss of salt bridge solution on ingress of sample solution and thus maintains a constant electrical resistance potential.

The glass sensing-electrode is, advantageously, a pH sensing-electrode and is, preferably, as small as possible to permit in vivo biological studies. The invention is not, however, limited to electrodes suitable for this purpose. Thus with a suitable choice of sensing-electrode, apparatus can be constructed in accordance with the invention for the detection of other specific ions and the method of providing a liquid junction and reference electrode is equally applicable to larger sensing-electrodes.

One form of combination electrode constructed in accordance with the invention will now be described, by way of example, with reference to the accompanying drawing which is a longitudinal cross-section of the electrode.

Referring to the accompanying drawing, a combination electrode, in the present example designed for measurements of the pH of gastric juices in the stomach, comprises a small glass pH sensing electrode 1 around which is arranged a reference electrode generally designated 2. The sensing electrode 1 includes a glass envelope 3 at least the end 4 of which, that comes into direct contact with the sample under investigation being formed of a glass, and of a thickness, that permits hydrogen ion migration. Contained within the envelope 3 is a buffer solution 5 into which protrudes a central metal/metal-salt electrode 6, which is connected to the inner conductor of a co-axial cable 7. The open end of the envelope 3 is plugged with a glass bead 16 formed round the central metal/metal-salt electrode 6 and held in place by an epoxy resin plug 8 to prevent the entry or loss of liquid to or from the envelope. The plug 8 also ensures a constant and high electrical resistance between the wire 10, the screening 11, and the electrode 6.

Wrapped round the body of the sensing-electrode 1 is a layer of double sided adhesive tape 9 around which is wound a small diameter chloridised silver wire 10 which acts as the reference element of the reference electrode 2. The wire 10 is connected to the screening 11 of the cable 7 which is connected to the input of a potential measuring device (not shown). Arranged on the tape 9 is a layer of potassium chloride crystals 12 arranged within which is a layer of woven glass fibre material 13. A plastics sleeve 14 is shrunk over the end of the wire 10 to prevent liquid reaching the joint between the wire 10 and the screening 11. A second sleeve 15 is shrunk over the sleeve 14 and the layers of crystals 12 and fibre glass 13 to hold the two layers in position round the glass envelope 3.

In operation the reference electrode 2 is filled with salt bridge solution and this can be achieved quite simply by immersing the combination electrode in a bath of potassium chloride solution. The potassium solution being an aqueous solution wets the glass of the glass fibre layer 13 and since the fibres of the weave are close together there is a relatively strong capillary action so that the solution is drawn up into the reference electrode 2. The glass fibre layer 13 also controls the size of the liquid junction and since the surface area of the liquid at the open end of the reference electrode 2 is small and the liquid is held in place by the capillary action of the glass fibre 13 during operation when the electrode system is immersed in the sample, there is substantially no loss of salt bridge solution, other than by minimal diffusion, permitting continuous readings over a long period without the need for replenishment of the salt bridge solution. Even when the electrode is exposed to the air, loss of salt bridge solution by evaporation will only take place in significant amounts over a prolonged period and refilling can be achieved easily as described above.

I claim:

1. A combination electrode comprising a glass sensing electrode and a reference electrode, said reference electrode comprising:

a layer of a crystalline salt bridge material encircling the body of the sensing electrode;

a layer of an absorbent for a salt bridge solution lying within the crystalline layer and extending to one end of the crystalline layer;

a reference conductor extending into the salt bridge material and making electrical contact with the salt bridge solution in the absorbent layer; and a sleeve to retain the crystalline layer in position, said sleeve being open at the said one end of the crystalline layer to provide direct communiction between the absorbent layer and the exterior of the electrode and being closed at the opposite end of said crystalline layer.

2. A combination electrode as claimed in claim 1 in which said absorbent comprises a woven glass-fibre material.

* * * * *